(12) United States Patent
Bowman et al.

(10) Patent No.: US 8,275,529 B2
(45) Date of Patent: Sep. 25, 2012

(54) APPARATUS AND METHOD FOR CONTROLLING A HYBRID VEHICLE

(75) Inventors: Timothy James Bowman, Bexley (GB); Robert Colin Helle-Lorentzen, Chelmsford (GB); Donatus Andreas Josephine Kees, Billericay (GB)

(73) Assignee: Ford Global Technologies, LLC, Dearborn, MI (US)

( * ) Notice: Subject to any disclaimer, the term of this patent is extended or adjusted under 35 U.S.C. 154(b) by 443 days.

(21) Appl. No.: 12/637,919

(22) Filed: Dec. 15, 2009

(65) Prior Publication Data
US 2010/0152984 A1      Jun. 17, 2010

(30) Foreign Application Priority Data
Dec. 16, 2008    (GB) ................................ 0822864.5

(51) Int. Cl.
*B60K 1/02* (2006.01)
(52) U.S. Cl. ............................ 701/54; 701/22; 180/65.21
(58) Field of Classification Search .................... 701/22, 701/36, 67, 78, 101–104; 180/65.21–65.285
See application file for complete search history.

(56) References Cited

U.S. PATENT DOCUMENTS

| | | | |
|---|---|---|---|
| 7,178,618 B2 * | 2/2007 | Komeda et al. | 180/65.275 |
| 7,604,076 B2 * | 10/2009 | Anderson | 180/65.28 |
| 2003/0098185 A1 | 5/2003 | Komeda et al. | |
| 2008/0200305 A1 | 8/2008 | Anderson | |

FOREIGN PATENT DOCUMENTS
GB          2031822          4/1980

OTHER PUBLICATIONS

Andrew Barr and Alireza Veshagh, Fuel Economy and Performance Comparison of Alternative Mechanical Hybrid Powertrain Configurations, SAE 2008-01-0083, University of Warwick, 2008 World Congress, Detroit, Michigan, Apr. 14-17, 2008.

* cited by examiner

*Primary Examiner* — Richard M. Camby
(74) *Attorney, Agent, or Firm* — David B. Kelley; MacMillan, Sobanski & Todd, LLC

(57) ABSTRACT

A control unit 13 moves an engine throttle 15 to the wide open position whenever the driver wishes to decelerate. This maximizes the transfer of rotational energy from the vehicle wheels 6 to a flywheel 12 which is coupled to a drivetrain 7,8,9 because pumping losses in the engine 2 are much reduced due to the open throttle. The energy stored in the flywheel 12 can be used at a later time to supplement the engine's motive power. The control unit 13 also controls an electro hydraulic clutch 11 which couples and decouples the flywheel to and from the drivetrain through a continuous variable transmission (CVT) 10. The gear ratio of the CVT 10 is set by the ECU 13.

6 Claims, 1 Drawing Sheet

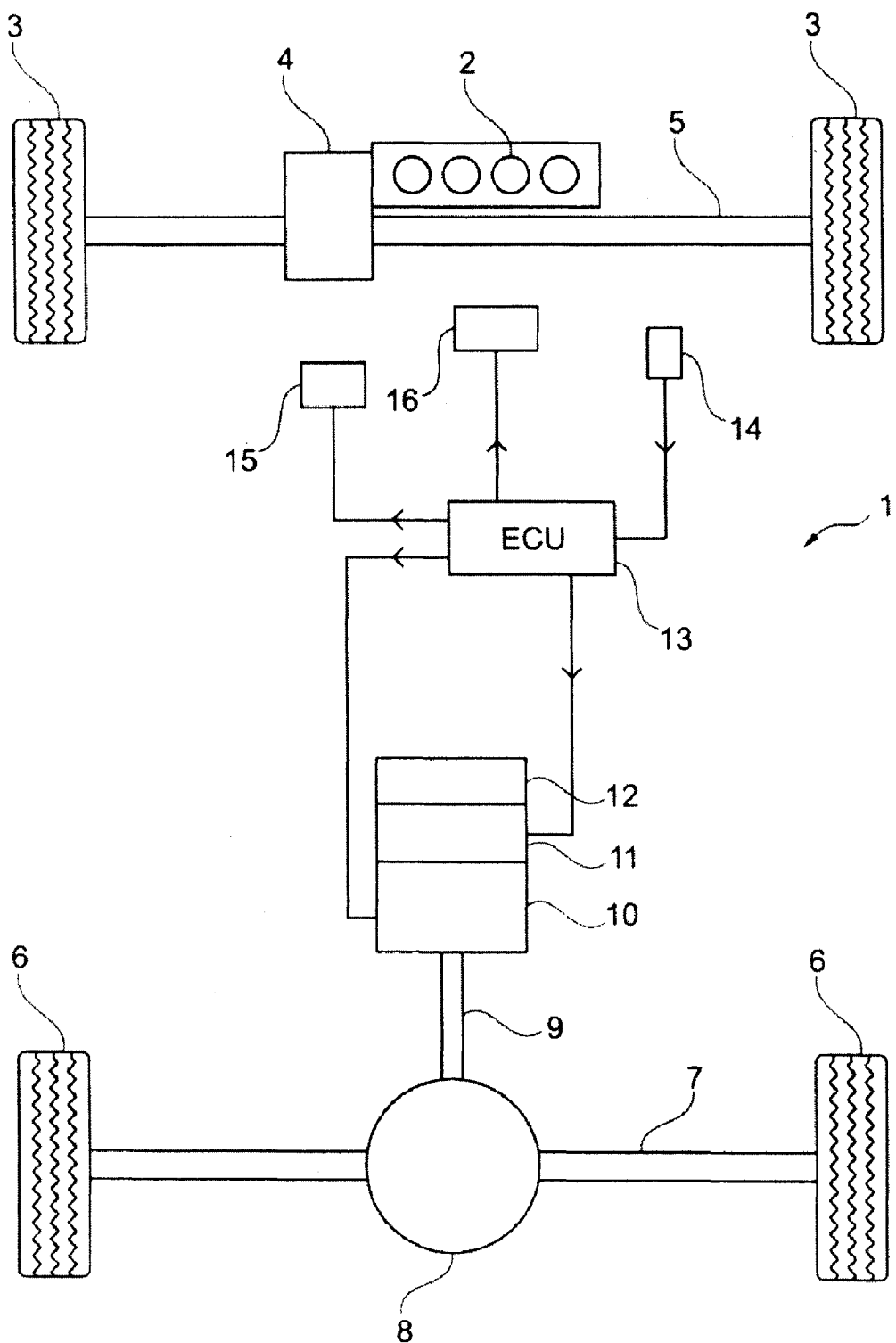

APPARATUS AND METHOD FOR CONTROLLING A HYBRID VEHICLE

BACKGROUND OF THE INVENTION

This invention relates to an apparatus and method for controlling a hybrid vehicle having an internal combustion engine as a primary mover and a secondary mover which incorporates an energy storage device.

It is known to provide a vehicle with a secondary source of motive power. Such secondary sources of motive power can comprise a rechargeable battery and electric motor combination or a flywheel, for example. This invention has particular application to a flywheel hybrid vehicle but is not limited thereto.

SAE technical paper 2008-01-0083, Apr. 14-17, 2008, describes an arrangement consisting of a continuously variable transmission (CVT) connected between the engine and gearbox of a vehicle and configured to drive a flywheel through a gearset. The arrangement can add or subtract power to that supplied by the engine.

In a flywheel-based energy storage and recovery system, manipulation of the CVT ratio achieves control of energy storage and recovery. When the ratio is set so as to speed up the flywheel, energy is stored and when the ratio is set so as to slow down the flywheel, energy is recovered.

A road car is capable of very high power transfer during braking and the key to hybrid system effectiveness is capturing as much of this (normally wasted) energy as possible. However, vehicle retardation is additionally caused by needing to overcome the pumping losses from motoring the engine during such retardation. Typically the degree of this retardation is greater for a gasoline engine, compared with a diesel engine, as during braking the intake throttle is almost completely shut. Therefore, pumping losses can be significant. As a consequence of motoring the engine, the amount of available energy to transfer to a flywheel or other energy storage device is diminished, and less than the overall kinetic energy of the vehicle. In short, because of the need to overcome pumping work, the available energy to be stored is less than ideal.

SUMMARY OF THE INVENTION

According to a first aspect, the invention consists of a control unit for a hybrid vehicle having an internal combustion engine and an energy storage device, the control unit being adapted to generate control signals for opening a throttle of the engine and coupling the energy storage device to a drivetrain of the vehicle when the control unit receives an input signal from a vehicle sensor indicative of a vehicle operating condition.

In a second aspect, the invention comprises a method of operating a hybrid vehicle having an internal combustion engine and an energy storage device, including the steps of: whilst the vehicle is in motion, detecting a vehicle operating condition, opening a throttle of the engine and coupling the energy storage device to a drivetrain of the vehicle.

In a third aspect, the invention comprises a hybrid vehicle having an internal combustion engine and an energy storage device,
a sensor for detecting a vehicle operating condition,
a control unit for receiving a signal from the sensor and for generating first and second control signals,
a throttle responsive to said first control signal for controlling airflow into the engine,
coupling means responsive to said second control signal for coupling the energy storage device to a drivetrain of the vehicle,
the control unit being adapted to generate said first and second control signals to open the throttle and couple the energy storage device to the drivetrain when the sensor detects said vehicle operating condition whilst the vehicle is in motion.

Optionally, the control unit may generate a further control signal for causing the hybrid vehicle's fuel supply system to cut the supply of fuel to the engine on detection of said vehicle operating condition.

A vehicle operating condition may be, for example, a zero engine torque demand or a vehicle deceleration demand.

A sensor for measuring engine torque demand may be an accelerator pedal position sensor, thus indicating a zero torque demand when the driver lifts his/her foot off the accelerator pedal.

Alternatively or additionally, zero engine torque demand may be indicated by an on-board cruise control system which detects when the driver has cancelled a cruise operation and therefore requires zero torque from the engine.

For detection of the vehicle deceleration demand, a brake pedal position sensor may be employed.

The energy storage device may be a flywheel and the coupling means may comprise a continuously variable transmission and clutch arrangement as is conventionally used in flywheel hybrid vehicles. In response to a signal from the control unit to the coupling means, the clutch connects the flywheel to the driveline and the CVT adjusts its ratio so that energy is transferred from the driveline to the flywheel. With the throttle open (preferably wide open) while the flywheel is spinning up, no energy is being used in overcoming any pumping losses in the engine, hence, a maximised amount of available energy can be transferred to the flywheel.

The invention is capable of being incorporated in any internal combustion engine-flywheel hybrid architecture. For example, the vehicle could be configured to have a first axle driven by the engine with the flywheel being connectable to a second axle via a separate driveline. Alternatively, the engine and flywheel could be connectable to the same axle via a common driveline.

In the case of a vehicle fitted with an auto-shift manual gearbox, the control unit can additionally be adapted to open the clutch between the engine and gearbox or select a neutral or a high gear while the flywheel is spinning up. This provision reduces further the energy losses in the vehicle's driveline.

BRIEF DESCRIPTION OF THE DRAWINGS

An embodiment of the invention will now be described, by way of example only, with reference to the drawing which is a schematic representation of a vehicle incorporating an example of a control unit in accordance with the invention.

DETAILED DESCRIPTION OF THE PREFERRED EMBODIMENTS

A vehicle 1 includes an internal combustion engine 2 driving a pair of front wheels 3 through a gearbox 4 and a front axle 5. A pair of rear wheels 6 is connected via a rear axle 7, differential 8 and propshaft 9 to a continuously variable transmission (CVT) 10. An electro-hydraulic clutch 11 is connected between the CVT 10 and a flywheel 12.

An electronic control unit (ECU) 13 receives an input signal from an accelerator pedal position sensor 14. A throttle 15, fuel injection system 16 and the clutch 11 and CVT 10 all receive electrical control signals from the ECU 13.

The throttle 15 and fuel injection system 16 regulate, respectively, the amount of air and fuel fed to the engine in accordance with known technologies.

The flywheel 12 is able to spin up when the vehicle is in motion and the clutch 11 has coupled the flywheel 12 to the CVT 10.

The rotational motion of the rear wheels 6 is transmitted to the flywheel 12 through the differential 7, propshaft 9, CVT 10 and clutch 11.

The speed of the flywheel is controlled by the CVT ratio which can be set by a signal from the ECU 13 in a known manner.

In operation, while the vehicle 1 is in motion and the driver lifts his/her foot off the accelerator pedal (not shown), the pedal position sensor 14 detects that the pedal position is at the upward end of its fullest extent of travel, thereby signifying that there exists a zero engine torque demand. The sensor 14 sends a signal to the ECU 13 notifying it that engine torque demand is currently zero. In response, the ECU 13 computes an appropriate gear ratio setting for the CVT 10 to allow any rotational motion, capable of being transmitted by the CVT 10, to cause the flywheel 12 to spin up. This computation is done in a known manner. Additionally, the ECU 13 generates output signals to the clutch 11 causing it to close, the fuel supply system 16, causing it to cut the supply of fuel to the engine 2 and to the throttle 15, causing it to open fully.

Hence, with the throttle wide open and the fuel supply cut, the energy removed from the rotating components of the vehicle by the engine is minimised. Thus the energy transfer from the rotating rear wheels 6 to the flywheel 12 is optimised. The energy stored in the flywheel 12 can be used at a later time to supplement the motive power of the engine in order to propel the vehicle. In this case, the flywheel 12 drives the rear wheels 6. This is achieved by adjusting the gear ratio of the CVT 10 under the control of the ECU 13.

While the specific example described herein relates to the use of a flywheel as an energy storage device, the invention can also be applied to hybrid vehicles incorporating other energy storage devices such as a rechargeable battery.

We claim:

1. A hybrid vehicle comprising:
    an internal combustion engine,
    a flywheel,
    a sensor for detecting a vehicle operating condition,
    an accelerator pedal,
    a throttle for controlling airflow into the engine,
    a clutch including an input connected directly to the flywheel and an output,
    a differential including an input and two outputs, each output driveably connected a vehicle wheel,
    a continuously variable transmission including an output connected directly to the input of the differential, and an input connected directly to the output of the clutch,
    a control unit for receiving a signal from the sensor, and generating in response to the signal from the sensor, first and second control signals that open the throttle and couple the flywheel to the input of the differential when the sensor indicates that the accelerator pedal is released while the vehicle is in motion.

2. A hybrid vehicle according to claim 1 in which the control unit is adapted to generate a third control signal for causing the hybrid vehicle's fuel supply system to cut the supply of fuel to the engine on detection of said vehicle operating condition.

3. A hybrid vehicle according to claim 1 in which the vehicle operating condition is a zero engine torque demand.

4. A hybrid vehicle according to claim 1 in which the vehicle operating condition is a vehicle deceleration demand.

5. A hybrid vehicle according to claim 3 in which the sensor is an accelerator pedal position sensor.

6. A hybrid vehicle according to claim 1 in which the engine is connected to a first axle and the flywheel is connected to a second axle of the vehicle.

* * * * *